Oct. 19, 1937.　　　H. C. DRAKE　　　2,096,577
AIR CONDITIONING APPARATUS
Filed May 3, 1934
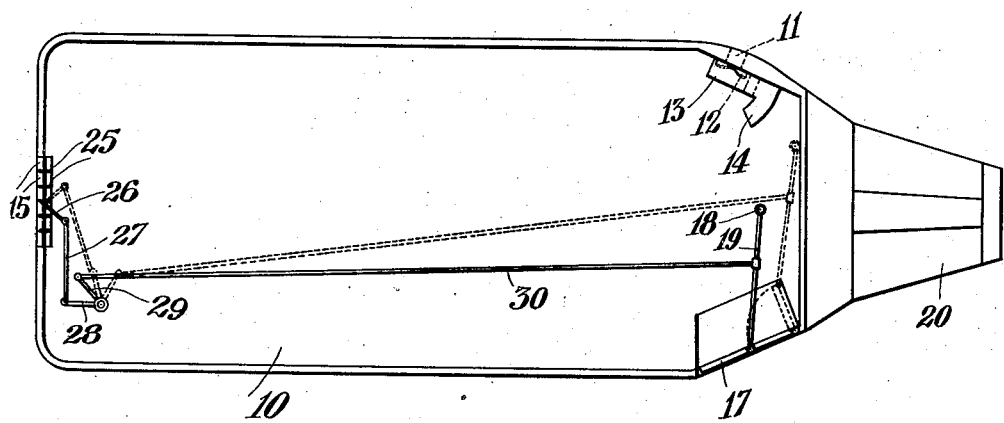
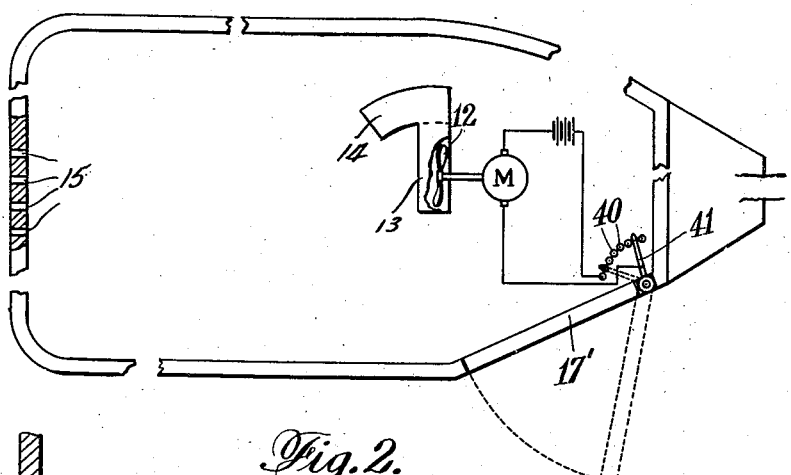
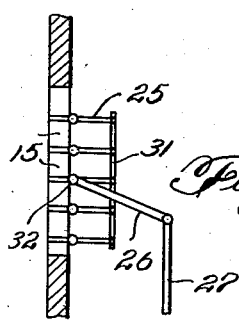
Inventor
Harcourt C. Drake
By Joseph H. Lipschutz
Attorney Patented Oct. 19, 1937

2,096,577

UNITED STATES PATENT OFFICE 2,096,577

AIR CONDITIONING APPARATUS

Harcourt C. Drake, Hempstead, N. Y., assignor to Sperry Products, Inc., Brooklyn, N. Y., a corporation of New York Application May 3, 1934, Serial No. 723,713

3 Claims. (Cl. 98—2)

This invention relates to apparatus adapted to be employed in connection with air conditioning systems of vehicles, particularly vehicles operated by internal combustion engines. When such vehicles are air conditioned it has been found that the valuable effect of air conditioning is lost at those times when the door of the vehicle is opened, as, for instance, in a bus when passengers are taken on or discharged. At such times it is found that the opening of the door reduces the pressure within the vehicle and not only the outside air but the fumes from the engine seep into the bus and make the atmosphere within the vehicle highly objectionable.

It is the principal object of my invention, therefore, to provide a method of and means for preventing such fumes and other objectionable gases from entering the vehicle at times when the vehicle has stopped and the door has been opened.

Further objects and advantages of my invention will become apparent in the following detailed description.

In the accompanying drawing,

Fig. 1 is a plan view of a bus with the top removed showing one form of my invention applied thereto.

Fig. 2 is a side elevation, largely diagrammatic, of a portion of the interior of the bus, showing another form of my invention applied thereto.

Figure 3 is an enlarged detail view showing the shutter operating mechanism in Fig. 1.

Referring to Fig. 1, I have shown my invention as applied to an automotive vehicle, in this case a bus, although it will be apparent that the invention has many other applications. The bus 10 is shown as provided with an air conditioning system. Said system is illustrated only diagrammatically and may comprise an air intake 11, blower 12, washer 13, and inlet 14 for discharging air into the interior of the bus. The air is discharged to the exterior through a plurality of openings such as 15. The bus is provided with a door 17 operated by the operator by means of handle 18 and the usual linkage 19 to permit passengers to board and alight from the bus.

When the door 17 of the vehicle is opened there is a marked reduction in pressure within the vehicle and fumes from the engine 20 as well as unconditioned air from outside the bus will enter, not only by way of door 17 but will seep up through the openings in the floor with which such vehicles are usually provided. To remedy this objectionable feature I provide in one form of my invention, as shown in Fig. 1, means for preventing such sharp reduction in pressure within the vehicle and on the contrary maintaining the pressure to prevent the entrance of such fumes and unconditioned air. For this purpose I have provided the outlets 15 with a plurality of pivoted shutters 25 all of which are adapted to be operated by means of a linkage system 26, 27, 28, 29 and 30 connected to the link 19 with which the operator opens the door. The shutters 25 are connected by a bar 31 to which each shutter is pivotally connected so that rotation of the pivot post 32 of any shutter operates all of the shutters simultaneously. Link 26 is shown connected to post 32 of one of the shutters, so that when the operator operates link 19 to open door 17, the linkage system just described is operated from the full line position to the dotted line position to close shutters 25 and thus close the outlet 15. The intake air system continues to operate and the blower 12 continues to deliver fresh air, but since the outlet 15 has been closed the pressure within the vehicle is maintained to prevent the entrance of fumes and any substantial amount of unconditioned air by way of the door or floor openings.

In a modified form of my invention, shown in Fig. 2, I do not rely upon closing the outlet 15 and thus need not provide the system 25—30 inclusive. An outlet 15 is provided as in the Fig. 1 form but said outlet is always open. Instead, I provide means for increasing the speed of motor M which drives the blower 12 so that conditioned air will be discharged into the vehicle at an increased rate when the door 17' is opened than normally discharges into the vehicle. This likewise will serve to maintain the pressure within the vehicle when the door has opened to an extent such as to prevent fumes and unconditioned air in any substantial quantity from entering the vehicle. To accomplish this I may provide in the circuit of motor M a rheostat 40 with which is designed to cooperate a rheostat arm 41 which travels from the rheostat as the door 17 is opened in such manner as to cut out resistance in the circuit of motor M as the door 17 opens, thus increasing the speed of said motor. The arm 41 may be carried directly by door 17' as shown.

In accordance with the provisions of the patent statutes, I have herein described the principle and operation of my invention, together with the apparatus which I now consider to represent the best embodiment thereof. But I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, an air conditioned enclosure having an air inlet, an air outlet, a closure member communicating with unconditioned air outside the enclosure and means for opening and closing said closure member, and means for substantially preventing entrance of unconditioned air when said closure member is opened, said last-named means comprising means actuated by the opening of the closure member for closing said outlet.

2. In combination, an air conditioned enclosure having an air inlet, an air outlet, a closure member communicating with unconditioned air outside the enclosure and means for opening and closing said closure member, means for substantially preventing entrance of unconditioned air when said closure member is opened, said last-named means comprising means for closing said outlet, and a connection between said closure member and said closing means whereby said closing means is actuated to close said outlet when said closure member is opened and to open said outlet when said closure member is closed.

3. The method of conditioning an enclosure having means for admitting air therein, means for discharging air therefrom, and a closure member communicating with unconditioned air outside the enclosure, which consists in delivering conditioned air into the enclosure through the air admitting means, discharging the excess air through the air discharging means, and closing the air discharging means to prevent discharge of air therethrough when said closure member is opened.

HARCOURT C. DRAKE.